(12) United States Patent
Morris

(10) Patent No.: US 7,561,671 B2
(45) Date of Patent: Jul. 14, 2009

(54) SECONDARY SUBSCRIBER LINE OVERRIDE SYSTEM AND METHOD

(75) Inventor: Joseph Morris, Flushing, NY (US)

(73) Assignee: Net2Phone, Inc., Newark, NJ (US)

( * ) Notice: Subject to any disclaimer, the term of this patent is extended or adjusted under 35 U.S.C. 154(b) by 738 days.

(21) Appl. No.: 11/336,916

(22) Filed: Jan. 23, 2006

(65) Prior Publication Data

US 2006/0140352 A1 Jun. 29, 2006

Related U.S. Application Data

(63) Continuation of application No. 09/682,927, filed on Nov. 1, 2001, now Pat. No. 7,127,043.

(51) Int. Cl.
*H04M 11/04* (2006.01)
*H04L 12/66* (2006.01)

(52) U.S. Cl. ................... 379/37; 379/90.01; 379/93.05; 379/93.07

(58) Field of Classification Search ............. 379/37–45, 379/88.22, 93.01, 93.05, 93.09, 100.15, 219–221.02, 379/114.02; 370/352–357, 410, 468, 140
See application file for complete search history.

(56) References Cited

U.S. PATENT DOCUMENTS

| | | | |
|---|---|---|---|
| 4,104,486 A | 8/1978 | Martin | |
| 4,122,308 A | 10/1978 | Weinberger et al. | |
| 4,136,262 A | 1/1979 | Clark, Jr. | |
| 4,198,545 A | 4/1980 | Haist et al. | |
| 4,209,668 A | 6/1980 | Weinberger et al. | |
| 4,226,360 A | 10/1980 | Simjian | |
| 4,332,982 A | 6/1982 | Thomas | |
| 4,410,765 A | 10/1983 | Hestad et al. | |
| 4,439,636 A | 3/1984 | Newkirk | |
| 4,468,529 A | 8/1984 | Samuel et al. | |
| 4,521,857 A | 6/1985 | Reynolds | |
| 4,585,904 A | 4/1986 | Mincone | |
| 4,594,477 A | 6/1986 | Noirot | |
| 4,656,657 A | 4/1987 | Hunsicker | |
| 4,751,728 A | 6/1988 | Treat | |
| 4,751,729 A | 6/1988 | Coleman | |
| 4,813,065 A | 3/1989 | Segala | |
| 4,829,554 A | 5/1989 | Barnes et al. | |

(Continued)

OTHER PUBLICATIONS

D.C. Swinehart et al., "Adding Voice to an Office Computer Network", IEEE Global Telecommunications Conference, Nov. 28-Dec. 1, 1983, Conference Record vol. 1 of 3, pp. 392-398.

(Continued)

*Primary Examiner*—Melur Ramakrishnaiah
(74) *Attorney, Agent, or Firm*—Davidson Berquist Jackson & Gowdey LLP

(57) ABSTRACT

A method and system of utilizing a secondary telephone line service, and in one embodiment encompasses analyzing a dialing sequence to convert from utilizing the secondary telephone line service to utilizing a primary telephone line service without the use of a manual override. By referencing a database of numbers, the present invention is able to determine if an outgoing service request is compatible with a preferred interface (e.g., the secondary interface), and, if not, to direct the outgoing service request to another interface (e.g., the primary interface, such as a POTS network).

14 Claims, 2 Drawing Sheets

U.S. PATENT DOCUMENTS

| | | |
|---|---|---|
| 4,878,236 A | 10/1989 | Ray et al. |
| 4,878,240 A | 10/1989 | Lin et al. |
| 4,888,822 A | 12/1989 | Weinberger et al. |
| 4,905,273 A | 2/1990 | Gordon et al. |
| 4,935,951 A | 6/1990 | Robinson et al. |
| 4,935,956 A | 6/1990 | Hellwarth |
| 4,989,230 A | 1/1991 | Gillig et al. |
| 5,003,584 A | 3/1991 | Benyacar |
| 5,012,507 A | 4/1991 | Leighton et al. |
| 5,163,042 A | 11/1992 | Ochiai |
| 5,173,933 A | 12/1992 | Jabs et al. |
| 5,187,710 A | 2/1993 | Chau |
| 5,204,895 A | 4/1993 | Yoshiura |
| 5,303,297 A | 4/1994 | Hillis |
| 5,319,701 A | 6/1994 | Hird et al. |
| RE34,677 E | 7/1994 | Ray et al. |
| 5,341,374 A | 8/1994 | Lewen et al. |
| 5,425,085 A | 6/1995 | Weinberger et al. |
| 5,448,635 A | 9/1995 | Biehl et al. |
| 5,481,592 A | 1/1996 | Azer |
| 5,488,653 A | 1/1996 | Dimolitsas et al. |
| 5,519,769 A | 5/1996 | Weinberger et al. |
| 5,530,736 A | 6/1996 | Comer et al. |
| 5,577,264 A | 11/1996 | Tuohino |
| 5,606,595 A | 2/1997 | Ejzak |
| 5,606,602 A | 2/1997 | Johnson et al. |
| 5,666,428 A | 9/1997 | Farinelli et al. |
| 5,708,422 A | 1/1998 | Blonder et al. |
| 5,754,640 A | 5/1998 | Sosnowski |
| 5,802,502 A | 9/1998 | Gell et al. |
| 5,805,669 A | 9/1998 | Bingel et al. |
| 5,825,865 A | 10/1998 | Oberlander et al. |
| 5,838,785 A | 11/1998 | Hirata |
| 5,845,205 A | 12/1998 | Alanara et al. |
| 5,862,203 A | 1/1999 | Wulkan et al. |
| 5,867,495 A | 2/1999 | Elliott et al. |
| 5,875,244 A | 2/1999 | Nagato |
| 5,889,856 A | 3/1999 | O'Toole et al. |
| 5,894,595 A | 4/1999 | Foladare et al. |
| 5,905,736 A | 5/1999 | Ronen et al. |
| 5,907,548 A | 5/1999 | Bernstein |
| 5,909,445 A | 6/1999 | Schneider |
| 5,910,946 A | 6/1999 | Csapo |
| 5,930,708 A | 7/1999 | Stewart et al. |
| 5,930,727 A | 7/1999 | Henry, Jr. |
| 5,943,404 A | 8/1999 | Sansom et al. |
| 5,960,061 A | 9/1999 | Fahie et al. |
| 5,966,658 A | 10/1999 | Kennedy, III et al. |
| 5,978,456 A | 11/1999 | Takeuchi et al. |
| 5,995,830 A | 11/1999 | Amin et al. |
| 6,005,925 A | 12/1999 | Johnson et al. |
| 6,012,142 A | 1/2000 | Dokic et al. |
| 6,029,047 A | 2/2000 | Ishida et al. |
| 6,038,440 A | 3/2000 | Wu |
| 6,064,882 A | 5/2000 | Coyne et al. |
| 6,067,452 A | 5/2000 | Alexander |
| 6,069,890 A | 5/2000 | White et al. |
| 6,073,003 A | 6/2000 | Nilssen |
| 6,091,721 A | 7/2000 | Greenberg et al. |
| 6,137,877 A | 10/2000 | Robin et al. |
| 6,141,341 A | 10/2000 | Jones et al. |
| 6,167,278 A | 12/2000 | Nilssen |
| 6,185,413 B1 | 2/2001 | Mueller et al. |
| 6,195,553 B1 | 2/2001 | Claffery et al. |
| 6,198,920 B1 | 3/2001 | Doviak et al. |
| 6,219,525 B1 | 4/2001 | Imai et al. |
| 6,269,157 B1 | 7/2001 | Coyle |
| 6,292,662 B1 | 9/2001 | Ziv et al. |
| 6,332,073 B1 | 12/2001 | Nilsson et al. |
| 6,363,065 B1 * | 3/2002 | Thornton et al. ............ 370/352 |
| 6,373,929 B1 | 4/2002 | Johnson et al. |
| 6,418,324 B1 | 7/2002 | Doviak et al. |
| 6,504,831 B1 | 1/2003 | Greenwood et al. |
| 6,614,780 B2 | 9/2003 | Hakim et al. |
| 6,683,870 B1 | 1/2004 | Archer |
| 6,714,644 B1 | 3/2004 | Cohn et al. |
| 6,741,870 B1 | 5/2004 | Holmstrom et al. |
| 6,751,210 B1 * | 6/2004 | Shaffer et al. ............... 370/352 |
| 6,778,656 B1 | 8/2004 | Stevens et al. |
| 6,826,405 B2 | 11/2004 | Doviak et al. |

OTHER PUBLICATIONS

Daniel C. Swinehart "Telephone Management in the Etherphone System", IEEE/IEICE Global Telecommunications Conference '87, Conference Record vol. 2 of 3, Nov. 15-18, 1987, pp. 1176-1180.

Douglas B. Terry and Daniel C. Swinehart, "Managing Stored Voice in the Etherphone System", 1987 ACM 089791-242-X/87/0011/0103, pp. 103-104.

Douglas B. Terry and Daniel C. Swinehart, "Managing Stored Voice in the Etherphone System", ACM Transactions on Computer Systems, vol. 6, No. 1, Feb. 1988, pp. 3-27.

Harrick M. Vin, et al. "Multimedia Conferencing in the Etherphone Environment", IEEE, Oct. 1991, pp. 69-79.

Hiroshi Kobayashi and Hideaki Haruyama, "Voice, Data and Video Integrated Broadband Metropolitan Area Network", Electronics and Communications in Japan, Part 1, vol. 73, No. 11, 1990, pp. 34-42.

P. Venkat Rangan and Daniel C. Swinehart, "Software Architecture for Integration of Video Services in the Etherphone System", IEEE Journal on Selected Areas in Communication, vol. 9, No. 9, Dec. 1991, pp. 1395-1404.

Philip H. Reagan, "Is it the PBX or is it the LAN?", Datamation, The Telecom Manager Emerges, Mar. 1984, vol. 30, No. 3, pp. 3-4, 147, 148, 150.

Polle T. Zellweger et al., "An Overview of the Etherphone System and its Applications", 2nd IEEE Conference on Computer Workstations, Mar. 7-10, 1988, pp. 160-168.

R.P. McNamara, "Some Considerations of the Voice-Data Capabilities of Broadband Cable Networks", IEEE Digest of Papers Spring CompCon 82, Feb. 22-25, 1982, pp. 312-314.

* cited by examiner

SECONDARY SUBSCRIBER LINE OVERRIDE SYSTEM AND METHOD

CROSS-REFERENCE TO RELATED APPLICATIONS

This application is a continuation of U.S. application Ser. No. 09/682,927 filed Nov. 1, 2001 now U.S. Pat. No. 7,127,043, the entire contents of which are herein incorporated by reference.

BACKGROUND OF INVENTION

1. Field of the Invention

The present invention is directed to a method and system of utilizing a secondary telephone line service, and in one embodiment encompasses analyzing a dialing sequence to convert from utilizing the secondary telephone line service to utilizing a primary telephone line service without the use of a manual override.

2. Discussion of the Background

Most customers are used to utilizing the plain old telephone service (POTS). However, a number of new communications services are becoming available that increase the number of telephone line services available at residential and commercial premises. Two such services are Integrated Services Digital Network (ISDN) and Voice over IP (VoIP). Typically those services are unable to provide certain enhanced features (such as emergency dialing (911 services) and informational services (411)) because they are not connected to the POTS network that has traditionally been used to receive such calls. Known ISDN systems, therefore, include a manual switch that overrides the use of the ISDN system in favor of the POTS system (for emergency dialing or dialing in the case of a loss of power). However, such manual switches require physical access to the switch in order to perform the override function.

Emergency services are often time critical; accordingly, known systems include the ability to monitor phone calls to determine if a series of dialed digits represent an emergency call that requires extra processing. In one such system, when an emergency call is detected, the system flashes a porch light to better identify the house to the arriving emergency crew.

SUMMARY OF INVENTION

It is an object of the present invention to provide a monitoring system for calls made on a secondary telephone line service to determine if the calls are compatible with the services available on the secondary telephone line. In one such embodiment, the present invention monitors the digits dialed to determine if the outgoing call would more appropriately be directed to the POTS network. If so, the system of the present invention automatically switches from the secondary telephone line service to the POTS network without user intervention. If not, the secondary interface (e.g., a VoIP connection over telephone line or cable) is used.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

As secondary telephone line services become more prevalent, users are going to utilize those services as if they were POTS services. That means that cordless telephones will be connected to such services and users will expect to be able walk around with the cordless phone without thinking about the fact that the cordless phone base station is connected to a non-POTS connection. According, in the case of an emergency (e.g., the cordless phone user falls and is injured), the user is unlikely to think about pressing a manual override button to switch from a secondary line to the primary line. In fact, if a user has the cordless phone handset, that user is likely to be very far from the base station where such an override button might exist. Similarly, non-residents of the house or guests of the company would likely be unaware of the existence of the manual override and would be unable to utilize the phone for emergency services. There is, therefore, a need for an automatic switching system that converts from utilizing a secondary telephone line service to the POTS network without the need for user intervention.

Figure 1:
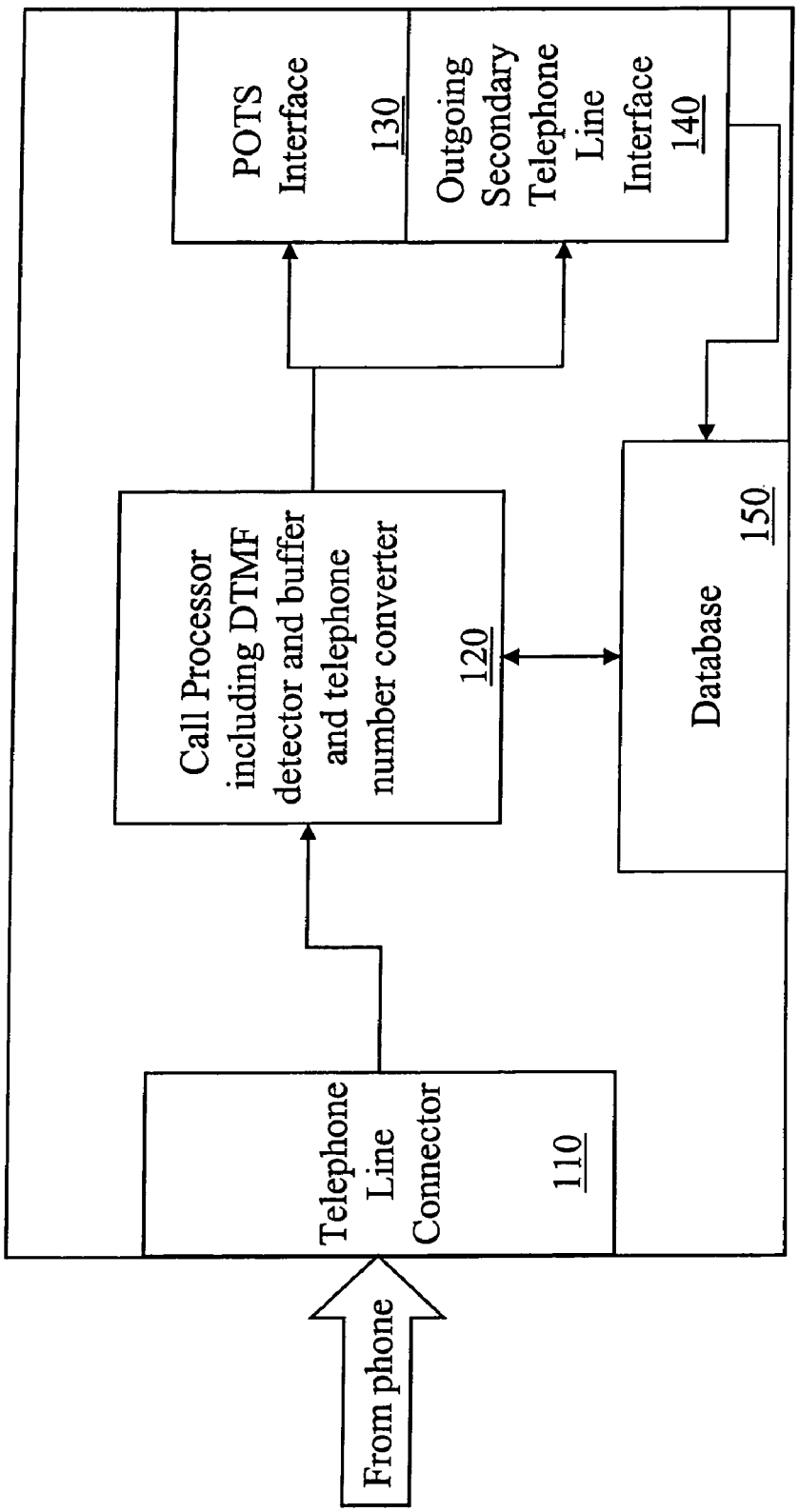
FIG. 1 is a block diagram of a secondary telephone line service box according to the present invention.

Referring now to the drawings, wherein like reference numerals designate identical or corresponding parts throughout the several views, FIG. 1 is a schematic illustration of a secondary telephone line service box 100 according to the present invention. A telephone line from a wall mounted telephone or a cordless telephone base station is connected to the telephone line connector 110. When a user takes the phone off-hook, the call processor 120 monitors the DTMF tones generated by the phone handset and determines if the number dialed corresponds to a telephone entry that should be directed to the POTS network or the secondary line network.

Figure 2:
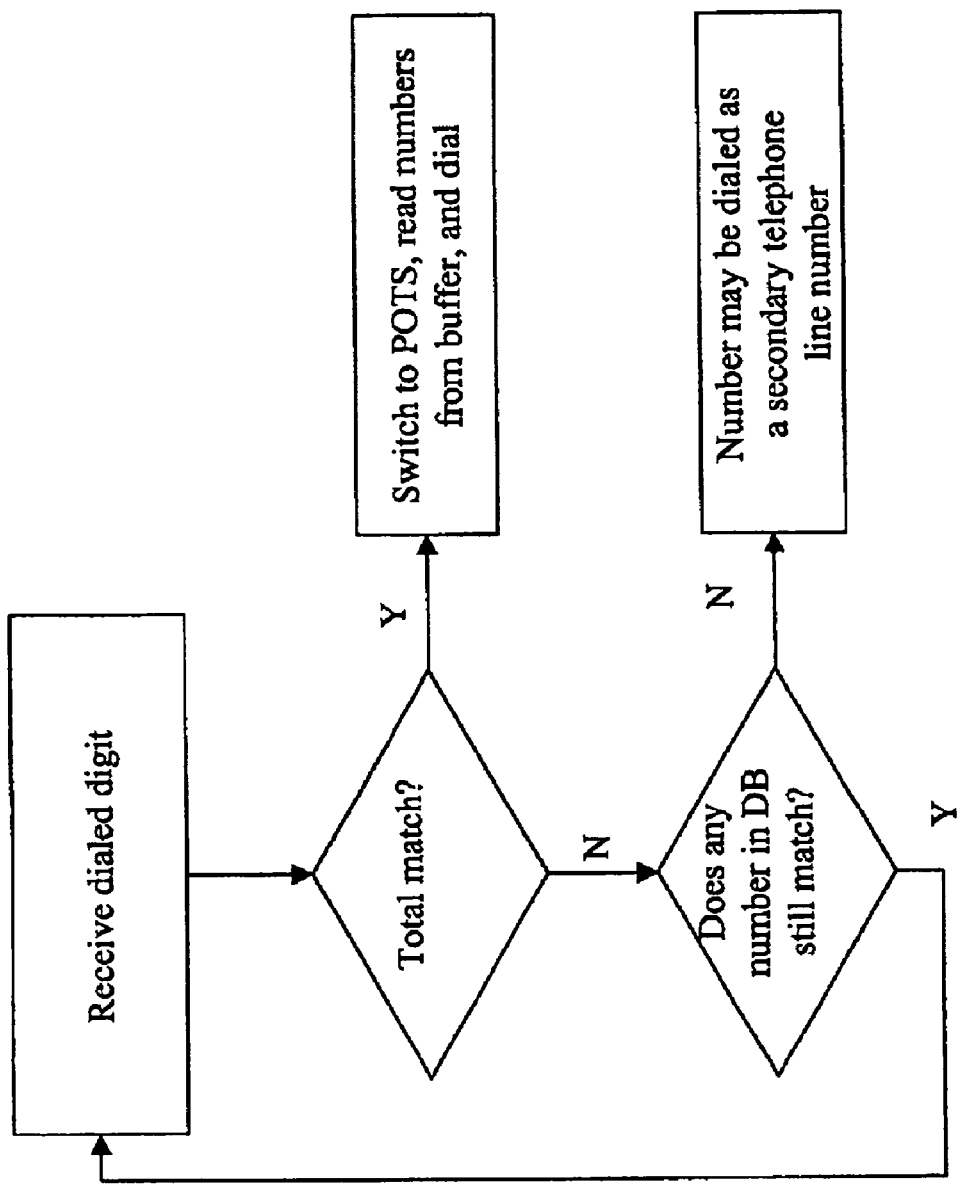
FIG. 2 is flow of a dialed digit processor that determines the destination telephone line of the call.

As shown in FIG. 2, the call processor 120 collects digits as dialed, and determines if the digits so far constitute a match of any number in the database of the box 100. If a total match occurs (e.g., the user has dialed all three digits of 911 in order), then the call processor 120 switches the outgoing call to the POTS interface 130 and re-dials the captured digits (thereby connecting the call to the desired service). The call processor can optionally temporarily block the return sound path to the user so that the user does not hear the digits being redialed, which may otherwise confuse the user.

If the call processor 120 determines that a total match has not yet occurred, then the call processor 120 determines if there are any remaining numbers in the database of numbers that might still be matched. For example, if the user has only dialed 9 so far, then the number 911 is still a possible match. In the case of such a partial match, control passes to the first step again to collect another digit.

On the other hand, if no number exists in the database that could still be a possible match, the box 100 may safely direct the call to the secondary telephone line interface 140. In doing so, the call processor may still have to collect additional digits to have the complete number, but at the end of the dialing sequence, the call processor can connect (e.g., via IP) to the remote call handler (e.g., a VoIP gateway that will complete the call).

The database of numbers may, in fact, be dynamically configurable. Utilizing communications services (e.g., IP), the remote call handler can contact the box 100 and identify numbers to be added or removed from the database. This may be helpful in environments where the remote call handler will eventually perform emergency services without the need for the POTS network, but where such service is not currently available. This would prevent all the boxes from having to be replaced or manually reconfigured in order to update the database 150. (The database could likewise be updated via the POTS interface 130 or via a local data connection (e.g., RS-232, Ethernet, wireless, keyboard or mouse). The database need not be a file-based database and may instead be any form of non-volatile memory.

Utilizing the box 100, the remote call handler may also be able to dynamically update which interface is used based on call prefixes. For example, if the remote call handler cannot route calls directed to a particular country, rather than forcing the user to remember that, the remote call handler would simply inform the box 100 that the database 150 should be updated to include the dialing prefix corresponding to that country (e.g., 01133 for calls to France from the US). In the same way, if the remote call handler was temporarily unable to provide services, then the database could be updated to direct all calls to the POTS interface 130.

The database 150 can also be directed to include call control information based on other conditions (e.g., the time of day). For example, the database may include a record which specifies that 911 services are to be directed to the POTS interface 130 from 5 PM until 9 AM. That is, the remote call handler will actually provide emergency services between 9 AM and 5 PM. Similarly, the database 150 may include an entry that indicates that calls to France should be placed to the POTS interface 130 at certain hours.

The database 150 may also contain call control information that identifies whether, in the presence of an error in connecting to the remote call handler, the box 100 should switch to the POTS interface 130 and automatically redial. Since the box 100 includes the ability to buffer the digits dialed, the box can automatically redial the number that did not complete.

The call processor 120 may also provide local called number translation. For example, the remote call handler may not be able to provide 800 services. Accordingly, the database would include an entry for numbers beginning with 800. However, based on the user's location, the database may also include a translation entry for the number 800-555-1212. For example, the database entry for that number indicates that the number can be translated to a non-800 number (e.g., 973-555-1212) that can be connected via the secondary interface 140. In this way, the database can override the normal use of the POTS interface 130 and increase the use of the secondary interface 140. (As shown above, the processing of FIG. 2 looks for the longest matching entry in the database, and does not indicate a total match until all possible longer numbers have been checked.) Just as local number translation can be performed, the box 100 can perform number translation remotely with the help of the remote call processor. If the remote call processor gets a connection request that it cannot handle but which the user's POTS service could, the remote call handler can send back the dialing sequence that the box 100 should use over the POTS interface 130.

Obviously, numerous modifications and variations of the present invention are possible in light of the above teachings. For example, in the case of power loss, the box 100 may automatically switch to the POTS interface 130. It is therefore to be understood that, within the scope of the appended claims, the present invention may be practiced otherwise than as specifically described herein.

The invention claimed is:

1. A system for routing a call between first and second voice telephone line interfaces depending on a service to be connected to, the system comprising:

a telephone digit detector for detecting and buffering a series of digits received from a telephone line connector;

a telephone number comparator for determining if the buffered series of digits matches a stored emergency telephone number; and a telephone line switch for directing an outgoing call to (1) the first voice telephone line interface if the telephone number comparator indicates that the buffered series of digits matches the stored emergency telephone number and (2) the second voice telephone line interface if the telephone number comparator indicates that the buffered series of digits does not match the stored emergency telephone number.

2. The system as claimed in claim 1, wherein the first voice telephone line interface comprises a POTS interface.

3. The system as claimed in claim 1, wherein the emergency number comprises 911.

4. The system as claimed in claim 2, wherein the second voice telephone line interface comprises a Voice-over-IP interface.

5. The system as claimed in claim 1, wherein the service to be connected to is not currently available on the second voice telephone line interface.

6. The system as claimed in claim 1, wherein the second voice telephone line interface comprises a Voice-over-IP interface.

7. The system as claimed in claim 1, wherein the first voice telephone line interface comprises a POTS interface, wherein the emergency number comprises 911, and wherein the second voice telephone line interface comprises a Voice-over-IP interface.

8. A method for routing a call between first and second voice telephone line interfaces depending on a service to be connected to, the method comprising:

detecting and buffering a series of digits received from a telephone line connector;

determining if the buffered series of digits matches a stored emergency telephone number; and directing an outgoing call to (1) the first voice telephone line interface if the buffered series of digits matches the stored emergency telephone number and (2) the second voice telephone line interface if the buffered series of digits does not match the stored emergency telephone number.

9. The method as claimed in claim 8, wherein the first voice telephone line interface comprises a POTS interface.

10. The method as claimed in claim 7, wherein the second voice telephone line interface comprises a Voice-over-IP interface.

11. The method as claimed in claim 10, wherein the service to be connected to is not currently available on the second voice telephone line interface.

12. The method as claimed in claim 8, wherein the emergency number comprises 911.

13. The method as claimed in claim 8, wherein the second telephone line interface comprises a Voice-over-IP interface.

14. The method as claimed in claim 8, wherein the first voice telephone line interface comprises a POTS interface, wherein the emergency number comprises 911, and wherein the second voice telephone line interface comprises a Voice-over-IP interface.

* * * * *